United States Patent [19]
Whitmer

[11] 4,449,122
[45] May 15, 1984

[54] PROXIMITY DETECTOR EMPLOYING A CRYSTAL OSCILLATOR

[76] Inventor: Melvin H. Whitmer, 2905 31st St., Zion, Ill. 60099

[21] Appl. No.: 257,212

[22] Filed: Apr. 24, 1981

[51] Int. Cl.³ .............. G08B 13/26; G08B 21/00
[52] U.S. Cl. ............................. 340/562; 331/65; 331/158
[58] Field of Search ............. 340/562; 331/65, 158

[56] References Cited
U.S. PATENT DOCUMENTS

| | | | |
|---|---|---|---|
| 2,138,731 | 11/1938 | Craig | 340/562 |
| 2,200,551 | 5/1940 | Hinckley | |
| 2,214,274 | 9/1940 | Glendenning et al. | |
| 3,254,313 | 5/1966 | Atkins et al. | 331/111 |
| 3,373,379 | 3/1968 | Black | 331/158 |
| 3,750,126 | 11/1973 | Solomon | 340/258 C |
| 3,764,861 | 10/1973 | Orris | 317/146 |
| 3,824,460 | 7/1974 | Gustafson | 324/61 R |
| 4,068,189 | 1/1978 | Wilson | 331/65 |
| 4,091,371 | 5/1978 | Mason, Jr. et al. | 340/274 R |
| 4,173,755 | 11/1979 | Butler | 340/562 |
| 4,310,806 | 1/1982 | Ogasawara | 331/65 |

*Primary Examiner*—Glen R. Swann, III
*Attorney, Agent, or Firm*—Wood, Dalton, Phillips, Mason & Rowe

[57] ABSTRACT

A proximity detector includes a crystal which is coupled to an impedance circuit having a value selected to sustain or prevent oscillation of the crystal. At selected points in the impedance circuit, a sensing line is coupled to add capacitance to initiate or terminate crystal oscillation. A detector circuit coupled to the amplified output of the oscillator signal is used to control an alarm circuit. By coupling the sensing line so that capacitance is added to the impedance circuit when the proximity of an individual or other animal tissue is sensed, oscillation of the crystal is initiated or terminated to control the alarm circuit. The oscillator circuit provides improved stability and sensitivity for use of the circuit in a variety of environments.

10 Claims, 3 Drawing Figures

PROXIMITY DETECTOR EMPLOYING A CRYSTAL OSCILLATOR

BACKGROUND OF THE INVENTION

The present invention relates to proximity systems and, more particularly, to capacitance controlled oscillator circuits for sensing the proximity of animal tissue to a given location.

The prior art is replete with examples of proximity devices for sensing the presence of persons or material to provide an alarm or other indicating signal. The devices use a variety of circuits, including oscillator circuits, wherein the impedance of the oscillator is changed in response to proximity detection to initiate or terminate oscillation. By way of example, common oscillator and sensing circuits have been used in portable and permanent intrusion alarm systems to provide oscillations and detections of the oscillations upon the touch of a particular area so that an alarm is initiated or transmitted to a security station. In other instances, the sensing circuits are utilized to detect the presence or absence of liquid in a particular area by sensing the change in capacitance caused by the presence of the liquid and thereafter initiating indicator or alarm devices. Such devices have also been used in security systems to protect individual items wherein the capacitance change caused by the touch of that item by an individual will initiate oscillation and signaling of an alarm circuit.

In still other instances, the proximity detector oscillator circuits have been used to provide foul detection in bowling alleys. In such cases, the detector usually takes the form of a wire or plate which is coupled to sense the change in capacitance as the foot of a bowler passes over the foul line. The plate or wire is attached to the oscillator circuit to initiate oscillation when the foot or other part of the body passes the foul line and thereby initiate operation of an alarm signal. The most common devices include oscillator circuits formed by vacuum tubes or transistors controlling the application of current to a detection device which initiates the indicator or alarm signal when the current increases beyond a predetermined value.

While the above and similar devices have been successful in providing proximity indications, the same have generally suffered from shortcomings due to lack of sensitivity and influences by stray and unwanted capacitance changes. When used in situations where great sensitivity is required, the rate of false alarms is high and the accuracy with respect to actual proximity must be reduced to reduce the rate of false alarms. In instances where the detectors are used in bowling alleys and similar environments for foul detection, the systems have been somewhat complicated and cumbersome and require greater complexity than is practicable for inexpensive and reliable use. In addition, the prior art systems are incapable of being easily installed with the requisite sensitivity and accuracy.

Accordingly, the present invention has been developed to overcome the shortcomings of the above-known and similar techniques and to provide an oscillator proximity detector system with increased sensitivity and reliability.

SUMMARY OF THE INVENTION

A crystal oscillator proximity system is disclosed which senses proximity by the change in capacitance supplied to a voltage biased crystal. The crystal is coupled in a circuit with a variable impedance which may be set to sustain oscillation of the crystal or to prevent oscillation of the crystal. The output of the oscillator is then coupled to an amplifier circuit and a detector coupled to sense the initiation or termination of oscillation to control an indicator or alarm. A plurality of wires may be coupled to different points in the oscillator circuit to change the impedance by the addition of capacitance to the oscillator circuit. The circuit can then be set to initiate or terminate oscillations in response to the change in capacitance and thereby control the initiation of an alarm or indicator circuit. The points of insertion of the capacitance can be varied depending upon the sensitivity desired for different applications of the proximity system.

It is therefore a feature of the present invention to provide a proximity sensing system which is simple in construction and more accurate in operation.

A further feature of the invention is to provide a crystal oscillator proximity system which operates over a relatively narrow frequency range and is highly stable in operation.

Still another feature of the invention is to provide a crystal oscillator proximity system which need not be tuned to a critical frequency and is less sensitive to drift and other physical changes.

Yet another feature of the invention is to provide a crystal oscillator proximity system which may be adapted to provide a variety of inputs for initiating or terminating oscillation as a means of sensing proximity.

Still another feature of the invention is to provide a crystal oscillator proximity system wherein the capacitance changing elements are enclosed in a plastic block for use in a bowling lane foul detection circuit.

Yet another feature of the invention is to provide a crystal oscillator proximity system which can be used to achieve different levels of sensitivity without any change in stability of the system.

These and other novel features of the invention will become apparent from the following detailed description of the invention when considered with the accompanying drawings wherein:

DETAILED DESCRIPTION OF PREFERRED EMBODIMENTS

Figure 1:
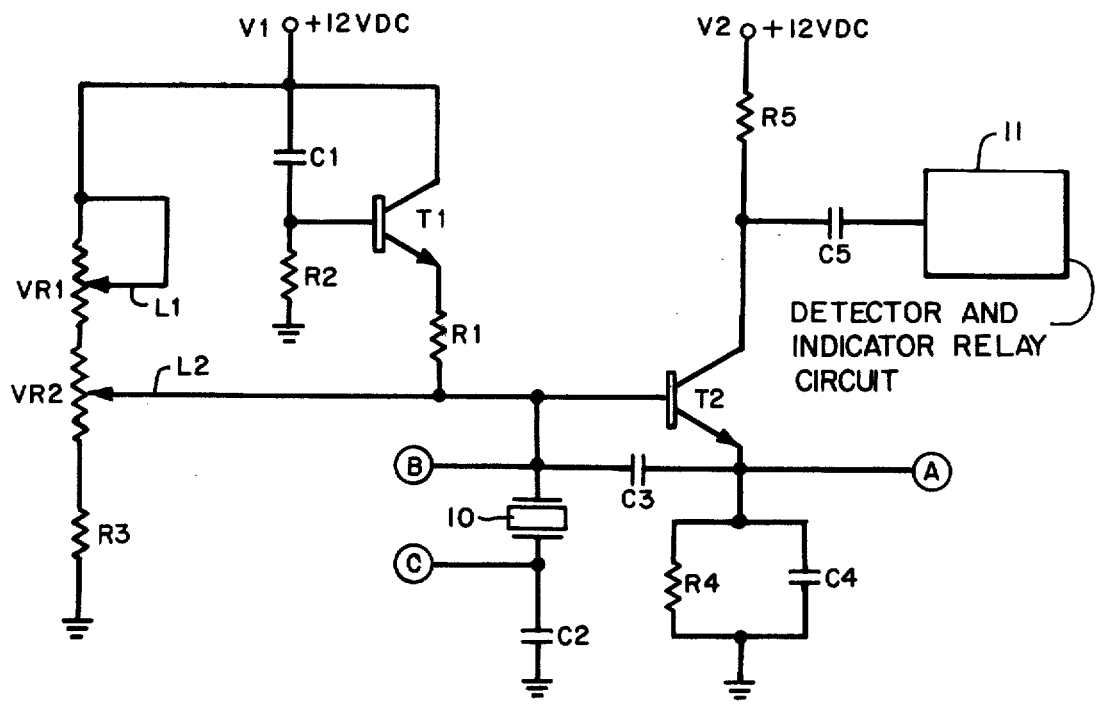
FIG. 1 is a schematic diagram of the crystal oscillator proximity system of the present invention.

Turning first to FIG. 1, there is disclosed a detailed diagram of the crystal oscillator proximity system of the present invention. The system generally includes a source of twelve volt DC bias potential which provides voltage to points V1 and V2 in the circuit diagram. The voltage V1 is controlled by a voltage dividing network to produce a variable bias voltage at the base of transistor T2. The divider network includes a transistor T1 having its collector coupled to the source of voltage V1 and its emitter coupled through resistor R1 to the base of transistor T2. Capacitor C1 is coupled between the voltage source V1 and the base of transistor T1 while resistor R2 is coupled between the base of transistor T1 and ground. Conventional three lead variable resistors VR1 and VR2, which may be potentiometers or other similar variable resistance devices, are coupled in series with resistor R3 between the voltage source V1 and ground. Variable resistor VR1 has its variable lead L1 coupled to one of its other leads to change the magnitude of the resistance VR1, while variable resistor VR2 has its variable lead L2 coupled to provide a variable output voltage to the base of transistor T2.

An oscillator and impedance circuit is coupled to the transistor T2 and includes a crystal 10 having two leads, one of which is coupled to the base of transistor T2 and the second of which is coupled through capacitor C2 to ground. A second capacitor C3 is coupled between the base of transistor T2 and the emitter of transistor T2 and thence in series with the parallel connection of resistor R4 and capacitor C4 to ground. The oscillator and impedance circuit receives a bias potential from the output L2 of variable resistor VR2. When the voltage from VR2 is set at a predetermined value, the values of capacitors C2, C3 and C4 and resistor R4 can be selected, depending on the voltage applied to the crystal, so that crystal 10 oscillates and thereby causes an oscillating voltage to be imposed on transistor T2. Transistor T2 is biased through resistor R5 to voltage V2 and operates in a known manner as an amplifier for the oscillating voltage produced by the crystal oscillations. An output signal is taken from the transistor T2 through capacitor C5 to detector and indicator relay means 11. The detector and indicator circuit 11 can be of any conventional construction such as an envelope detector and relay coupled to be energized in response to the presence or absence of a particular voltage level output signal.

In the circuits shown, the variable impedance produced by the capacitors C2, C3, C4 and resistor R4 can be set at various values, depending on the bias voltage produced by VR2, to sustain or prevent the oscillation of the crystal 10. Thereafter, in accordance with the present invention, the addition of further capacitance at points A, B or C, subsequent to the setting of the specific values of C2, C3, C4 and R4, can be used to initiate or terminate the crystal oscillation. The presence or absence of such oscillations can then be detected by circuit 11 to provide an indication or alarm signal.

In the embodiment of FIG. 1, the crystal can be selected to have an oscillation frequency of from 16 MHz to 18 MHz. Due to the crystal characteristics, the oscillating circuit will not be drift sensitive and the crystals do not have to be tuned to a critical frequency to provide the sensitivity and stability needed for proximity detection. In the system of FIG. 1, the range of capacitance required to change the crystal from an oscillating to the non-oscillating condition or vice versa, is narrow and the device is therefore capable of being more sensitive for proximity detection without producing a high false alarm rate. The system also lessens the likelihood that changes by humidity or other physical factors will affect the oscillating point of the circuit.

In the embodiment shown, the values of capacitors C2, C3 and C4 provide the means for initiating and terminating crystal oscillation. Any one of the three capacitors can be changed to start or stop crystal oscillation. Capacitor C2 is generally most sensitive between 1 pf and 5 pf and will initiate oscillation in that range. Capacitor C3 is most critical in the range limit of 5 pf to 25 pf and is most effective in changing the crystal from an oscillating to a nonoscillating condition. Capacitor C4 is referenced to ground and may be varied in value from a lower limit to an upper limit to create the oscillating condition. Capacitor C4 may have a lower limit of 25 to 100 pf depending on the crystal frequency and an upper limit of 125 to 200 pf. These values will change depending on the bias voltage coupled to crystal 10 by variable resistor VR2. It should be appreciated that by varying the value of the potential applied to the crystal 10 and the values of capacitors C2, C3 and C4, the capacitance range can be narrowed to very small limits so that crystal oscillation becomes sensitive to very small changes in capacitance.

In one particular embodiment of the invention, the proximity system can be used as an improved device for sensing foot fouls in a bowling alley. In the prior art, foul line detectors which use light beams for foul detection are subject to inaccuracies due to lane shifts, humidity, board warping and various other changing conditions. Similarly, foul line detectors using vacuum tube and transistor oscillator circuits are drift sensitive and subject to inaccuracies due to humidity and lower stability in the frequency range required for reliable use. In accordance with the present system, however, the crystal eliminates the need for a wide range of capacitance values and narrows the sensitivity range of the system while reducing interference from humidity and other physical factors.

Figure 2:
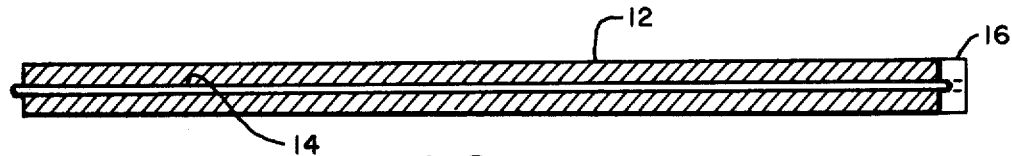
FIG. 2 is a side view of the sensor wire encased in a plastic enclosure for foul line detection.
Figure 3:
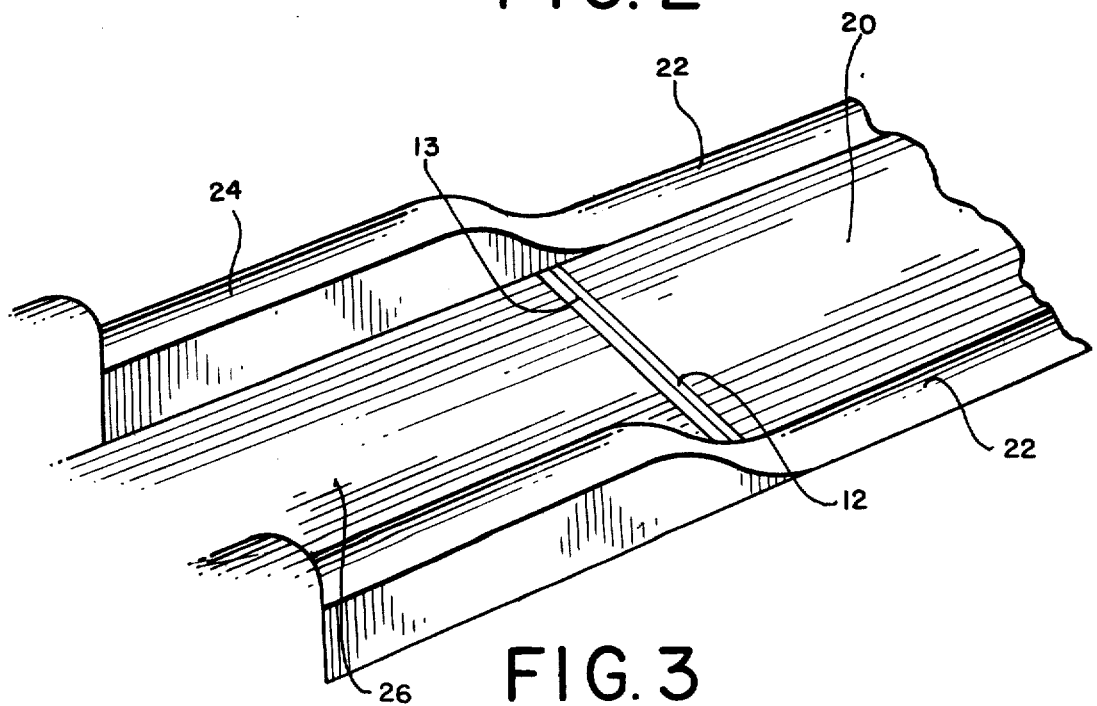
FIG. 3 is a perspective view of a bowling lane with the foul line detector in place.

FIGS. 2 and 3 show the use of the present proximity system as a bowling line foot foul detector. In FIG. 2, an electrical conductor (wire) 14 is encased in an elongate plastic enclosure 12 (which includes the foul line 13 on its surface) approximately 1 inch below and parallel to the foul line 13. The wire 14 may terminate in a coaxial coupling 16 for connection to the system in FIG. 1. When used in conjunction with the system of FIG. 1, the values of capacitors C2, C3 and C4 are first set to values which cause the system to be in a state where the crystal is either on the verge of beginning oscillation or on the verge of ceasing oscillation. The wire 14 is then placed in enclosure 12 and situated in the routed channel of a bowling lane 20 and 26 shown in FIG. 3. The ball return channels 22 and ball holder 24 are shown generally to depict the relative placement of the foul line in relation to the bowling lane.

If an individual using the bowling lane approaches the wire 14 in enclosure 12, the proximity of the body to wire 14 will cause capacitance to be added between the wire and ground in the amount of about 10 to 50 pf when the individual's foot passes over the foul line. The addition of this capacitance at any one of points A, B, or C can then be used to initiate or terminate the oscillation of oscillator 10. By controlling the value of voltage from variable resistor VR2, and impedance from capacitors C2, C3 and C4, the sensitivity of the circuit can be adjusted so that capacitance added at points A, B or C will initiate or terminate oscillation just as the bowler's shoe passes the wire 14 below the foul line 13.

By way of example, the capacitance value C2, C3 and C4 can be set to sustain crystal oscillation while no one is on the foul line. In this situation, the crystal vibrates mechanically due to the voltage bias supplied by variable resistor VR2 and the capacitance values fixed by capacitors C2, C3 and C4. The oscillation of the crystal causes the DC voltage from VR2 to be varied sinusoidally at the frequency of the crystal. This sinusoidal voltage is amplified by the transistor T2 to produce a sine wave signal of greater amplitude at the output of transistor T2. This output is coupled through capacitor C5 to produce a signal in detector and relay circuit 11 which may be used to provide an indicator or alarm signal.

It can thus be seen that if the individual approaches and passes over the wire 14 in the foul line enclosure 12, and if the wire 14 is connected to point A of the oscillating circuit, a capacitance of 10 to 50 pf is added to the value of C4 which exceeds the value required for crystal oscillation. The crystal therefore ceases to oscillate and no sine wave voltage is applied through capacitor C5 to the detector 11. This condition is used to cause the indicator or alarm to be activated by appropriate circuitry. Once the additional capacitance from the foul is removed, the capacitance coupled at point A is reduced and the crystal resumes its oscillation to turn off the signal and/or alarm at circuit 11.

In another embodiment of the invention, two wires could be coupled individually to points A and B in the impedance circuit. The two wires, when approached by an individual or other animal tissue, would provide a change in capacitance at capacitor C3 and thereby initiate or terminate crystal oscillation. In this instance, the value of capacitance could be selected to initiate or terminate oscillation with as little a change as 15 pf.

In still another application of the proximity circuit, a sensing wire 14 can be connected to point C in the circuit to start crystal oscillation. Capacitor C2 is the most sensitive capacitance in the oscillation circuit and, for that reason, can be used in situations where high sensitivity is desired. The crystal could be started by the addition of only 10 pf at the point C.

As can be seen by the above description, the addition of capacitance at each of the points A, B and C has the ability to initiate or terminate oscillation of the crystal depending on the initial setting of the impedance circuit. The system therefore provides increased sensitivity by providing a selection of variable impedance changes which are capable of initiating or terminating oscillation of the crystal. By adjusting the impedance so that the circuit is near the initiation or termination point of crystal oscillation, very small changes in capacitance at points A, B, or C can start or stop the oscillation and thus provide an effective means of sensing the proximity of human or animal tissue. Once the crystal oscillation is terminated or initiated, the output signal through capacitor C5 can be used to control the appropriate alarm or indicator circuit.

The above system provides for discrimination between animal tissue and other inanimate objects which may be placed near or adjacent the capacitance detecting wires 14. Thus, in the bowling lane application, the ball or other inanimate objects would not activate the foul line alarm. This provides for fewer false alarms and thereby increases the sensitivity and discrimination of the device.

As previously stated, the crystal oscillating proximity system of the present invention provides a highly selective and sensitive device which is resistant to changes in operation due to physical factors and yet highly sensitive to changes in capacitance. The system is not sensitive to drift and thereby does not require any critical tuning as commonly found in the prior art. The system, by using the crystal, reduces the number of elements required for reliable operation and thus reduces the complexity and cost regardless of its application. The simplicity and lower power requirements of the system also enable it to be replaced and/or substituted for existing systems with minimal costs and problems. These are all advantages which are not found in the prior art.

As will be appreciated, the circuit including the elements C1, R2, T1 and R1 acts as a start up circuit to initially provide a drive voltage to the crystal 10 until the capacitor C1 charges and the voltage from VR2 provides the operating voltage. This circuit, while not essential for the operation of the proximity detector, increases the likelyhood that circuit operation will be reliably initiated even after long periods of crystal inactivity.

It will also be understood from the above disclosure that the specific values for each of the elements of the proximity detector will be selected to accomplish the initiation and termination of oscillations as described above and will be dependent upon the selected crystal for use in the circuit and the characteristics of the transistors. Thus other values of biasing voltage and various element values may be selected in accordance with the present teachings. Obviously, many other modifications and variations of the present invention are possible in light of the above teachings. It is therefore to be understood that within the scope of the appended claims, the invention may be practiced otherwise than as specifically described.

I claim:

1. A proximity detecting crystal oscillator circuit comprising:

biasing means for providing a variable voltage including a fixed source of DC voltage, a transistor having a base, collector and emitter, said collector being connected to said fixed source of voltage, a capacitor coupled between the emitter and base, a resistor coupled between said emitter and ground, a resistor coupled to the collector and to a supply lead, a three-lead range selecting variable resistor having a first lead coupled to the collector of said transistor, a second variable lead coupled to said first lead, and a third lead coupled to a first lead of a second three-lead variable resistor, said second variable resistor having a second lead coupled through a resistor to ground, and a third variable lead coupled to said supply lead;

crystal means including a crystal having first and second leads, said second lead being coupled to said supply lead;

impedance means comprising a first capacitor coupled between said first lead of said crystal and ground, a second capacitor connected on one side of said second lead, a third capacitor connected between the other side of said second capacitor and ground, and a current limiting resistor coupled in electrical parallel with said third capacitor;

output means for providing a crystal oscillation output signal from said crystal means comprising a second transistor having a base, collector and emitter, the base of said second transistor being coupled to the common point between the second and third capacitor, the collector of said second transistor being coupled through a resistor to said fixed source of DC potential and a coupling capacitor coupled to the collector of said second transistor to provide an alternating output signal when said crystal is oscillating, said first, second and third capacitors being set to such values that said crystal is in a selected one of the states of oscillation or non-oscillation;

means coupled to the impedance means for changing the capacitance of the impedance means in response to the proximity of a capacitance means thereto; and means responsive to the output from said output means for providing an alarm/indicator signal, said means coupled to said impedance means comprising capacitance varying means responsive to the proximity thereto of a body having at least a preselected capacitance for varying the capacitance coupled to said crystal means to alternatively instantaneously initiate or terminate oscillation produced by said crystal means independently of the rate of movement of the body relative to said means for varying the capacitance coupled to said crystal means.

2. A proximity detecting crystal oscillator circuit comprising:

biasing means for providing a variable voltage including a fixed source of DC voltage, a transistor having a base, collector and emitter, said collector being connected to said fixed source of voltage, a capacitor coupled between the emitter and base, a resistor coupled between said emitter and ground, a resistor coupled to the collector and to a supply lead, a three-lead range selecting variable resistor having a first lead coupled to the collector of said transistor, a second variable lead coupled to said first lead, and a third lead coupled to a first lead of a second three-lead variable resistor, said second variable resistor having a second lead coupled through a resistor to ground, and a third voltage lead coupled to said supply lead;

crystal means including a crystal having first and second leads, said second lead being coupled to said supply lead;

impedance means comprising a first capacitor coupled between said first lead of said crystal and ground, a second a current limiting resistor coupled in electrical parallel with said third capacitor;

output means for providing a crystal oscillation output signal from said crystal means comprising a second transistor having a base, collector and emitter, the base of said second transistor being coupled to the common point between the second and third capacitor, the collector of said second transistor being coupled through a resistor to said fixed source of DC potential and a coupling capacitor coupled to the collector of said second transistor to provide an alternating output signal when said crystal is oscillating, said first, second and third capacitors being set to such values that said crystal is in a selected one of the states of oscillation or non-oscillation;

means coupled to the impedance means for changing the capacitance of the impedance means in response to the proximity of a capacitance means thereto; and means responsive to the output from said output means for providing an alarm/indicator signal, said circuit comprising a proximity detection system for detecting fouls on a bowling lane, said means coupled to the impedance means comprising at least one proximity sensing electrically conductive wire positioned adjacent the foul line of a bowling alley for varying the capacitance impedance coupled to the crystal means in response to the proximity of an individual.

3. The proximity detection system of claim 2 wherein said means responsive to said output signal comprises means responsive to the presence of said output signal for providing said indication signal.

4. The proximity detection system of claim 2 wherein said means responsive to said output signal comprises means responsive to the absence of said output signal for providing said indication signal.

5. The proximity detection system of claim 1 wherein said wire is enclosed in plastic.

6. A proximity detecting crystal oscillator circuit comprising:

biasing means for providing a variable voltage including a fixed source of DC voltage, a transistor having a base, collector and emitter, said collector being connected to said fixed source of voltage, a capacitor coupled between the emitter and base, a resistor coupled between said emitter and ground, a resistor coupled to the collector and to a supply lead, a three-lead range selecting variable resistor having a first lead coupled to the collector of said transistor, a second variable lead coupled to said first lead, and a third lead coupled to a first lead of a second three-lead variable resistor, said second variable resistor having a second lead coupled through a resistor to ground, and a third variable lead coupled to said supply lead;

crystal means including a crystal having first and second leads, said second lead being coupled to said supply lead;

impedance means comprising a first capacitor coupled between said first lead of said crystal and ground, a second capacitor connected on one side to said second lead, a third capacitor connected between the other side of said second capacitor and ground, and a current limiting resistor coupled in electrical parallel with said third capacitor;

output means for providing a crystal oscillation output signal from said crystal means comprising a second transistor having a base, collector and emitter, the base of said second transistor being coupled to the common point between the second and third capacitor, the collector of said second transistor being coupled through a resistor to said fixed source of DC potential and a coupling capacitor coupled to the collector of said second transistor to provide an alternating output signal when said crystal is oscillating, said first, second and third capacitors being set to such values that said crystal is in a selected one of the states of oscillation or non-oscillation;

means coupled to the impedance means for changing the capacitance of the impedance means in response to the proximity of a capacitance means thereto; and means responsive to the output from said output means for providing an alarm/indicator signal.

7. The system of claim 6 wherein the means for changing the capacitance comprises at least one electrically conductive wire coupled to change the capacitance of the impedance means in response to the proximity of animal tissue.

8. The system of claim 6 wherein the means for changing the capacitance of said impedance means comprises an elongate wire coupled to the common point between said second and third capacitor.

9. The system of claim 6 wherein the means for changing the capacitance of said impedance means comprises first and second elongate wires with said first wire being coupled to the common point between said second and third capacitors and said second wire being coupled to the second lead of said crystal.

10. The system of claim 6 wherein the means for changing the capacitance of said impedance means comprises an elongate wire coupled to the first lead of said crystal.

* * * * *